United States Patent
Eickhoff

(10) Patent No.: US 9,466,848 B2
(45) Date of Patent: Oct. 11, 2016

(54) POWER GENERATOR HAVING HYDROGEN MANIFOLD

(71) Applicant: Honeywell International Inc., Morristown, NJ (US)

(72) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 328 days.

(21) Appl. No.: 14/080,603

(22) Filed: Nov. 14, 2013

(65) Prior Publication Data

US 2015/0132676 A1    May 14, 2015

(51) Int. Cl.
| | |
|---|---|
| *H01M 8/06* | (2016.01) |
| *C01B 3/06* | (2006.01) |
| *H01M 8/24* | (2016.01) |
| *H01M 8/04* | (2016.01) |
| *F16K 7/00* | (2006.01) |
| *H01M 8/10* | (2016.01) |

(52) U.S. Cl.
CPC ............ *H01M 8/0606* (2013.01); *C01B 3/065* (2013.01); *F16K 7/00* (2013.01); *H01M 8/04208* (2013.01); *H01M 8/065* (2013.01); *H01M 8/241* (2013.01); *H01M 8/2485* (2013.01); *H01M 2008/1095* (2013.01); *Y02E 60/362* (2013.01); *Y02E 60/50* (2013.01)

(58) Field of Classification Search
CPC .............................. H01M 8/06; H01M 8/0606
See application file for complete search history.

(56) References Cited

U.S. PATENT DOCUMENTS

| | | | |
|---|---|---|---|
| 3,847,672 A * | 11/1974 | Trocciola et al. | ............ 429/410 |
| 2003/0228252 A1 | 12/2003 | Shurtleff | |
| 2007/0104996 A1 | 5/2007 | Eickhoff et al. | |
| 2008/0107930 A1 | 5/2008 | Eickhoff et al. | |
| 2009/0098419 A1* | 4/2009 | Eickhoff et al. | .................. 429/9 |
| 2012/0094196 A1* | 4/2012 | Eickhoff et al. | .............. 429/414 |

FOREIGN PATENT DOCUMENTS

| | | |
|---|---|---|
| EP | 2538481 A2 | 12/2012 |
| WO | WO-2005/090229 A1 | 9/2005 |

OTHER PUBLICATIONS

"European Application Serial No. 14188564.0, Response filed Nov. 20, 2015 to Extended European Search Report mailed Mar. 19, 2015", 11 pgs.
"European Application Serial No. 14188564.0, Extended European Search Report mailed Mar. 19, 2015", 5 pgs.
Eickhoff, Steven J., "Membrane Valve Modulated Gas Generator", U.S. Appl. No. 14/080,571, filed Nov. 14, 2013, 44 pgs.

* cited by examiner

*Primary Examiner* — Anca Eoff
(74) *Attorney, Agent, or Firm* — Schwegman Lundberg & Woessner, P.A.

(57) ABSTRACT

A power generator includes a cavity to accept a hydrogen producing fuel cartridge. A channel is coupled to receive hydrogen from the fuel cartridge. A manifold is coupled to the channel to receive hydrogen from the channel, the manifold having an opening to receive oxygen and water vapor, the manifold being positioned to provide the water vapor to the cavity. An array of fuel cell membranes is supported by the manifold to receive hydrogen from the manifold and oxygen from the opening in the manifold.

5 Claims, 13 Drawing Sheets

US 9,466,848 B2

POWER GENERATOR HAVING HYDROGEN MANIFOLD

BACKGROUND

Some hydrogen generators generate hydrogen by reacting water vapor with a hydride fuel. The water vapor has been provided by different sources, such as ambient, a reservoir of water, or even as a byproduct of a chemical reaction such as in the case of fuel cells. When hydrogen is not required from the hydrogen generator, the supply of water vapor is shut off. The shut off has been accomplished by somewhat complex arrangements of valves.

SUMMARY

A power generator includes a cavity to accept a hydrogen producing fuel cartridge. A channel is coupled to receive hydrogen from the fuel cartridge. A manifold is coupled to the channel to receive hydrogen from the channel, the manifold having an opening to receive oxygen and water vapor, the manifold being positioned to provide the water vapor to the cavity. An array of fuel cell membranes is supported by the manifold to receive hydrogen from the manifold and oxygen from the opening in the manifold.

A power generator includes a cavity to accept a hydrogen producing fuel cartridge. A channel is coupled to receive hydrogen from the fuel cartridge. A manifold is coupled to the channel to receive hydrogen from the channel, the manifold having an opening to receive oxygen and water vapor, the manifold being positioned to provide the water vapor to the cavity. An array of fuel cell membranes is supported by the manifold to receive hydrogen from the manifold and oxygen from the opening in the manifold. The manifold comprises an array of hydrogen providing channels to distribute hydrogen to an anode side of each fuel cell membrane. The manifold provides a second opening to expose a cathode side of each fuel cell membrane to oxygen provided via the first opening. An exhaust valve is coupled to the manifold to controllably exhaust gas. The power generator also includes a sensor and a controller coupled to the sensor and to the exhaust valve to control the exhaust valve responsive to signals from the sensor.

A method includes inserting a fuel cartridge into a cavity of a power generator, receiving hydrogen from the fuel cartridge into a hydrogen channel, distributing the hydrogen to an anode side of an array of fuel cell membranes via a manifold having an array of hydrogen channels, providing oxygen via an opening in the manifold to a cathode side of the array of fuel cell membranes to produce electricity, and providing water vapor to the fuel cartridge having a hydride that produces hydrogen when exposed to the water vapor.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
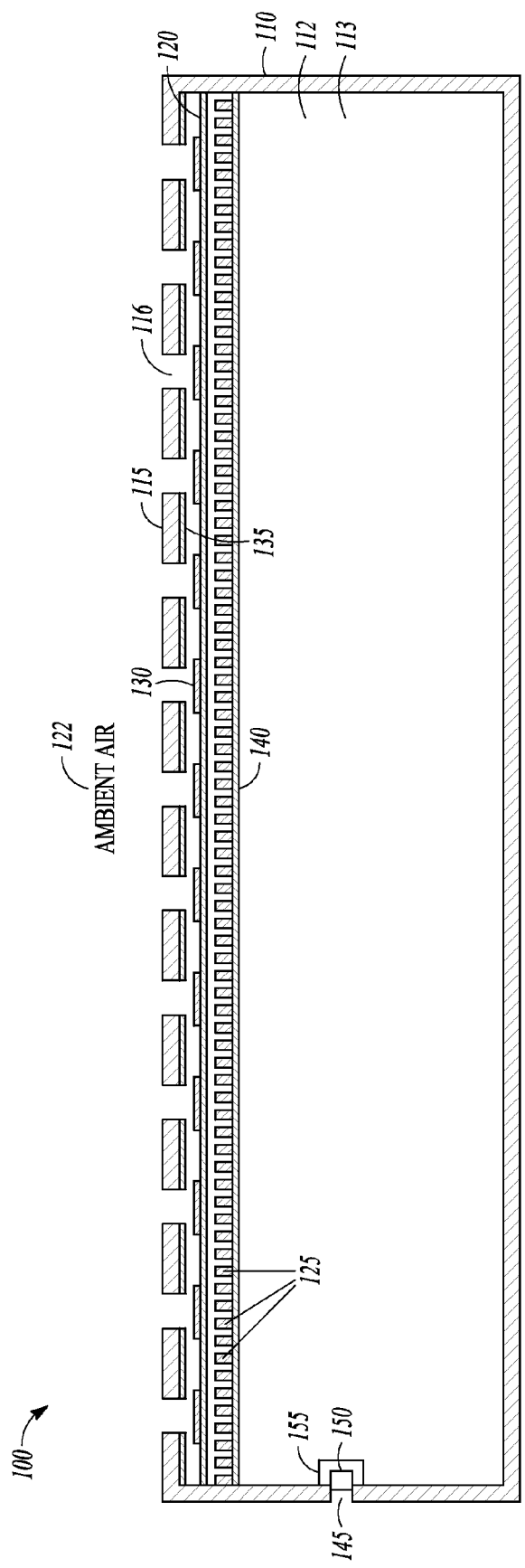
FIG. 1 is a block diagram cross section representation of a fuel cartridge having a membrane based valve assembly according to an example embodiment.

FIG. 1 is a cross sectional representation of a removable fuel cartridge 100. Cartridge 100 comprises a case 110 (metal or polymer) containing a water-reactive gas generating fuel 112 in a cavity 113. The cartridge 100 may be inserted into a gas consuming device, such as a power generator. In one embodiment the power generator comprises a fuel cell system and the generated gas comprises hydrogen. A side or face 115 of the case 110 is perforated 116, and exposes a selectively permeable membrane 120 (water vapor permeable, atmospheric gas impermeable) which separates the fuel 112 from the ambient environment 122 outside the case 110.

In one embodiment, the membrane 120 is positioned between the perforated face 115 and a permeable plate 125, which may be perforated in one embodiment. The membrane 120 is flexible, and moves between the plate 125 and face 115 responsive to a difference in pressure between the cavity 113 and ambient 122. The plate 125 and face 115 bound the movement of the membrane 120 in one embodiment such that the membrane is not unduly stressed via the difference in pressure that may develop. A typical gap may be up to a few hundred micron in some embodiments and more in others, depending on the lateral dimensions of the membrane. The membrane may be coupled to sides of the case 110 via adhesive on a perimeter of the membrane or other method to provide a seal that allows the difference in pressure to cause the membrane 120 to move transverse to the face 115.

In one embodiment, the membrane 120 comprises one or more valve plates 130 that move toward the perforations 116 when the pressure is higher inside the cavity 113, and move away from the perforations when the pressure inside the cavity is lower than ambient 122. In one embodiment, a gasket 135 is formed about the perforations which is compressible to form a seal with corresponding valve plates 130 when the difference in pressure causes the membrane to push the valve plates 130 into contact with the gasket. The gasket may be optional where the materials comprising the valve plates 130 and face 115 having perforations 116 form an adequate seal when pressed against each other by the different in pressure. The differences in pressure in some embodiments modulate up to few tenths of a pound per square inch in one embodiment.

In various embodiments, the number of perforations 116 in face 115 may vary between one and many, forming an array of perforations. Similarly, the number of valve plates may be the same as the number of perforations, and arranged in an array to mate with each corresponding perforation. In still further embodiments, one or more larger valve plates may be used such that each valve plate may cover multiple perforations.

In one embodiment, a gas permeable particulate filter 140 is positioned between fuel 112 and plate 125 to prevent fuel from clogging the perforations in the plate 125. The fuel in various embodiments may be porous to allow the water vapor passing through the perforated face 115, membrane 120 in areas other than those contain the valve plates 130, plate 125, and filter 140 to migrate through the fuel to generate more gas. The fuel porosity in one embodiment varies between approximately 15% and 20%. The porosity may be selected to allow adequate movement of gas and water vapor while at the same time providing a desired gas producing capability.

The gas also moves through the porous fuel 112 towards a gas exit 145. The gas exit in different embodiments may be positioned on a side of the case 110 that may be plugged into a gas consuming device. While the gas exit 145 is shown about a middle of the side of the case 115, it may be located in any convenient location on the case where the gas may be used. A check valve 150 may be coupled to the gas exit and be actuated by plugging the fuel container 100 into the gas consuming device. In still a further embodiment, a particulate filter 155 may be positioned about the check valve 150 and gas exit 145 to prevent the gas exit 145 from being clogged by fuel. Channels may be formed within cavity 113 to facilitate distribution of water vapor and generated gas in still further embodiments.

Figure 2:
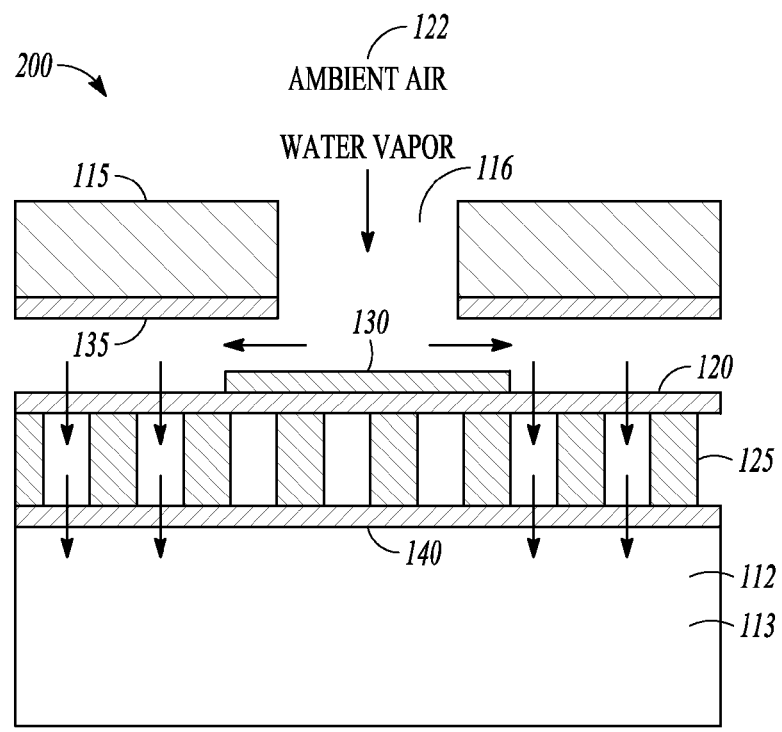
FIG. 2 is a block diagram cross section representation of a portion of the fuel cartridge of FIG. 1 showing the valve in an open position according to an example embodiment.
Figure 3:
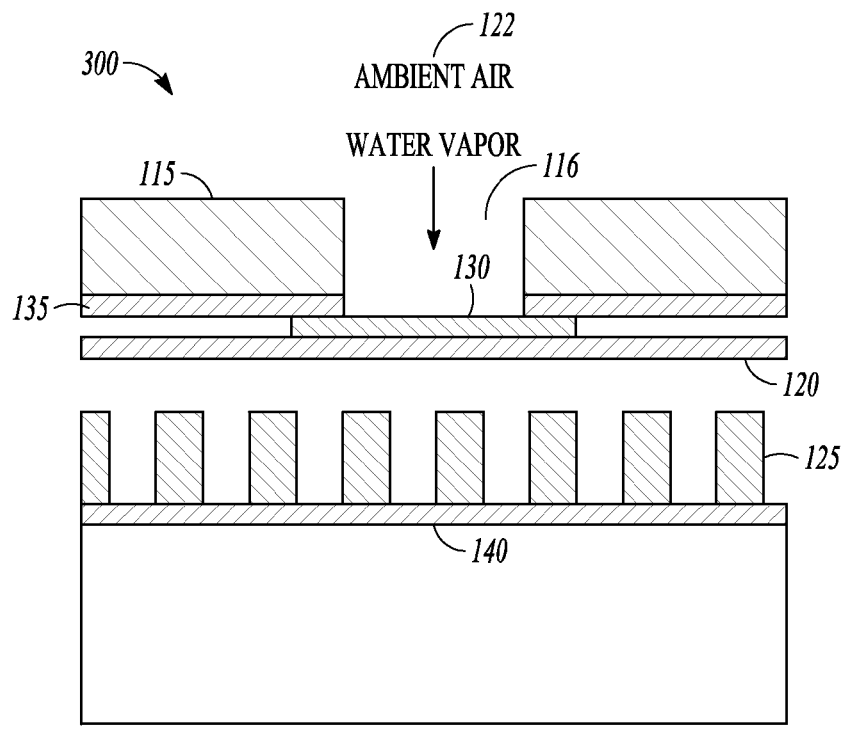
FIG. 3 is a block diagram cross section representation of a portion of the fuel cartridge of FIG. 1 showing the valve in a closed position according to an example embodiment.

FIGS. 2 and 3 are partial cross sections illustrating the interaction of the valve plates 130 with the perforated plate 115. At 200 in FIG. 2, when a low pressure occurs in chamber 113 due to gas being drawn out of the chamber for use, the resulting difference in pressure results in the membrane 120 being flexed toward the plate 125, allowing water vapor to enter through perforations 116, and pass through the membrane 120 at portions of the membrane not being covered by valve plates 130.

FIG. 3 illustrates the interaction of the valve plates 130 with the perforated plate 115 when the pressure inside the chamber 113 is greater than ambient 116 pressure. The membrane is shown as being pushed toward the perforated plate 115, causing the valve plates 130 to come into contact with the perforated plate 115, optionally via the gasket 135. As seen, the valve plates 130 are sized to be a little bit larger than the perforations 116 such that they serve to block flow of water vapor when contacting the perforations 116. When generated gas is drawn out via gas exit 145, the pressure decreases, allowing the valve plates to move away from the perforations 116 and once again allow water vapor to reach the fuel 112 through membrane 120. The flexible membrane with valve plates thus serves to regulate the water vapor flow and hence gas generation response to the difference in pressure.

In one embodiment, the water vapor reacts with the fuel 112 to generate hydrogen. The hydrogen is provided via gas exit 145 when the cartridge 100 is inserted into a fuel cell based power generator. The power generator may also cause the check valve 150 to be opened when the cartridge is inserted, allowing the hydrogen to exit.

Figure 4:
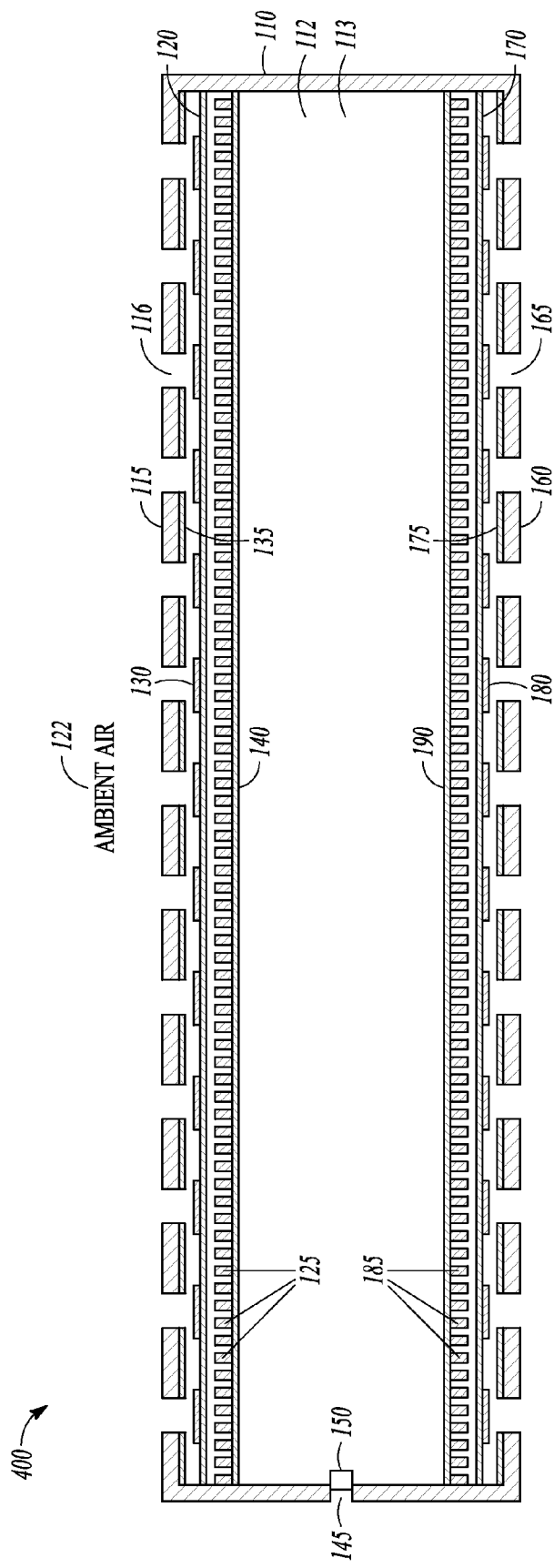
FIG. 4 is a block diagram cross section representation of an alternative fuel cartridge having a membrane based valve assembly according to an example embodiment.

FIG. 4 is a cross section of an alternative gas generating cartridge 400. Cartridge 400 also contains a water vapor membrane based valve arrangement as shown in FIG. 1 which is numbered consistently with FIG. 1. In addition, a second water vapor membrane based valve arrangement is illustrated on a further side of the cartridge 400. A side or face 160 is perforated as indicated at 165. Similarly to face 115, a gasket 170 may also be used, a similar membrane 175 may be positioned with valve plates 180 between the face 160 and a perforated plate 185. A particulate filter 190 may also be positioned between the fuel 112 and the perforated plate 185. Each of these elements operates similarly to the valve assembly shown on the other or opposite side of the case 110. In further embodiments, more than two such assemblies may be utilized.

Figure 5:
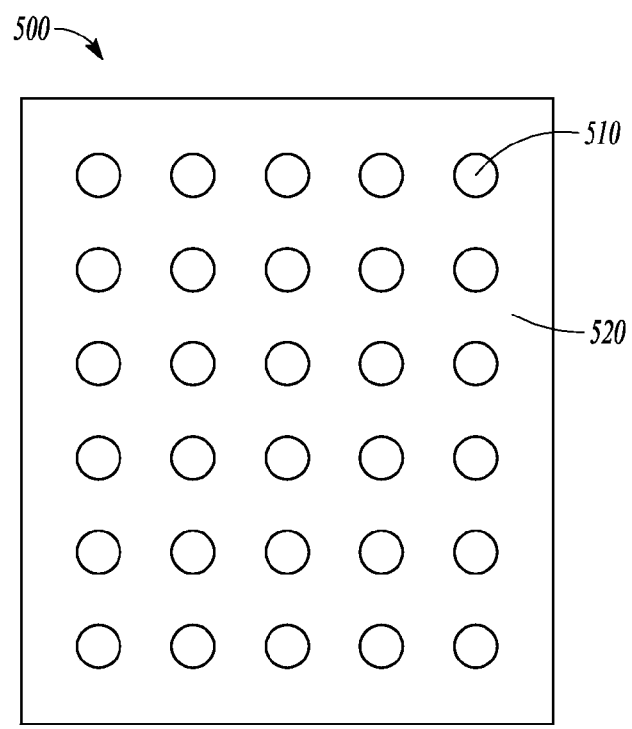
FIG. 5 is a top view representation of a membrane having an array of valve plates according to an example embodiment.

FIG. 5 is a top view of a membrane 500 representation. The membrane 500 in one embodiment supports an array of water and gas impermeable valve plates 510. The membrane 500 may be formed of Dupont Nafion® material or Gore® PRIMEA® membrane material that is metalized to form the plates 510. The valve plates may be formed of metal, such as gold, and may be patterned by deposition or otherwise formed on the membrane 500 in a position such that they will mate with the perforations in the perforated plate to form the water vapor valve assembly. Other materials, such as a polymer or plastic that is impermeable to gas may be used in further embodiments, and may be deposited, glued, or otherwise supported in position on the membrane 500.

Membrane 500 in one embodiment, where not covered by valve plates as indicated at 520 is water vapor permeable and gas impermeable. Ionomer type membranes may be used in some embodiments. Example membrane materials include Nafion or PRIMEA membranes.

Figure 6:
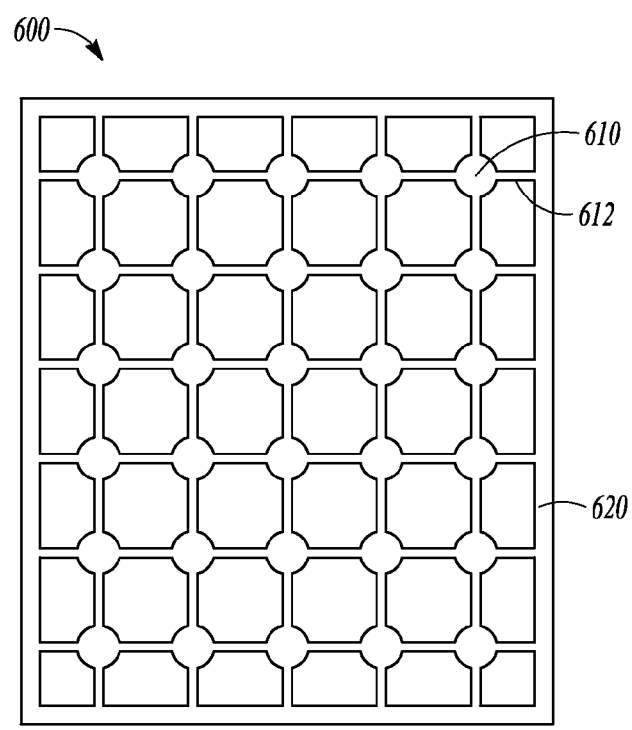
FIG. 6 is a top view representation of a membrane having an array of interconnected valve plates according to an example embodiment.

FIG. 6 is a top view of a membrane 600 representation. The membrane 600 in one embodiment supports an array of gas impermeable valve plates 610 that maybe interconnected by connectors 612 to provide additional structural integrity to the membrane as it flexes responsive to the difference in pressure. A perimeter band 620 may also be formed to provide additional structural integrity where the membrane 600 is attached to the case of the cartridge. The valve plates, connectors, and band may be formed of metal, such as gold, and may be patterned by deposition or otherwise formed on the membrane 600 in a position such that they will mate with the perforations in the perforated plate to form the water vapor valve assembly. Other materials, such as a polymer or plastic such as Kapton that is impermeable to gas may be used in further embodiments, and may be deposited, glued, or otherwise supported in position on the membrane 600. Each of the elements may be formed of different materials in further embodiments.

Membrane 600 in one embodiment, where not covered by valve plates as indicated at 615 is water vapor permeable and gas impermeable. Ionomer type membranes may be used in some embodiments. Example membrane materials include Nafion or PRIMEA membranes.

Figure 7:
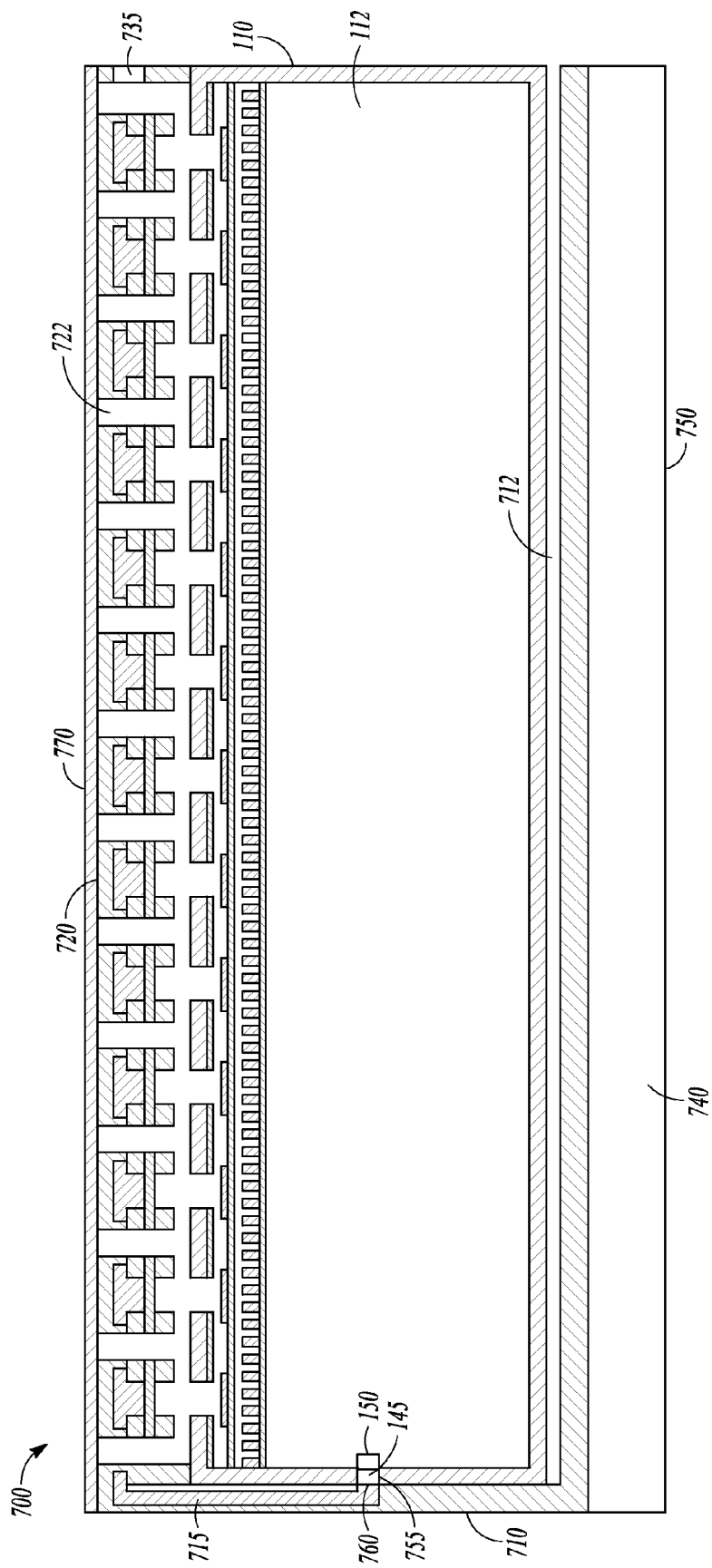
FIG. 7 is a cross section representation of a power generator utilizing a gas generating cartridge having a membrane based valve assembly according to an example embodiment.
Figure 8:
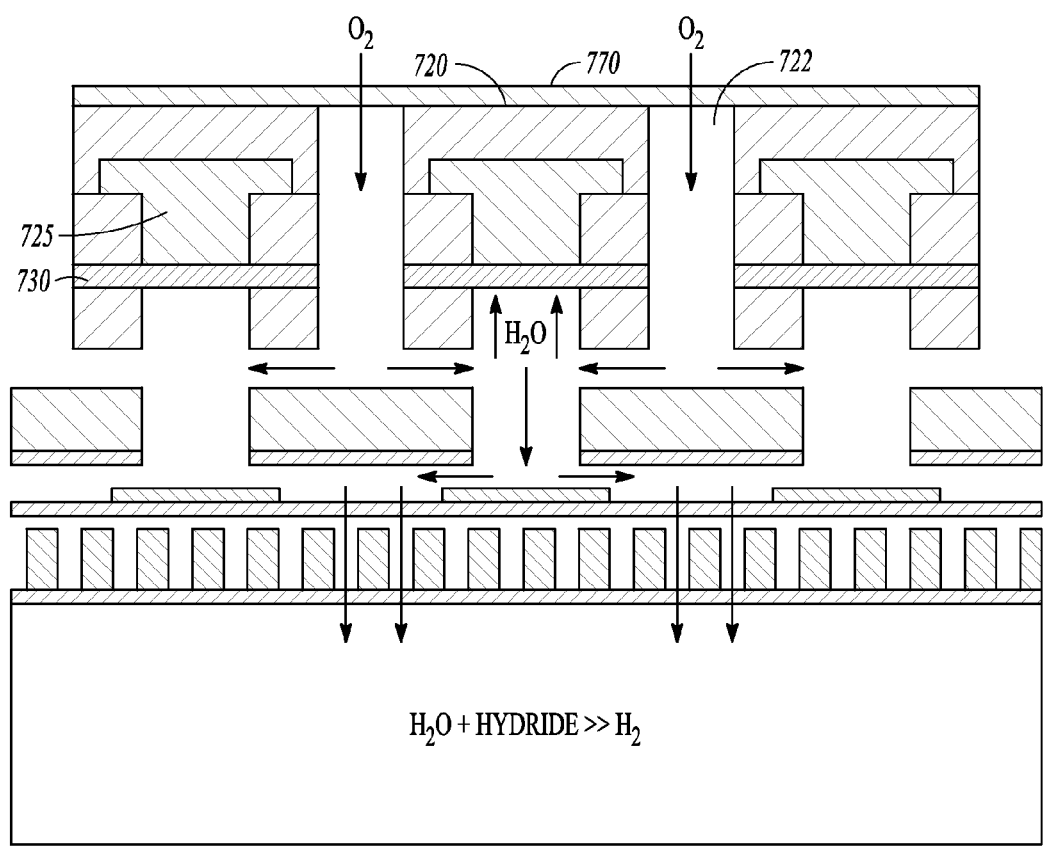
FIG. 8 is a portion of the power generator of FIG. 7.

FIG. 7 is a cross section representation of a device 700 to utilize a gas generating cartridge case 110. FIG. 8 is a blown up view of a portion of the device 700 and has reference numbers consistent with those used in FIG. 7. In one embodiment, device 700 includes a case 710 having a cavity 712 into which the cartridge 100 may be inserted. Case 710 may be formed of the same material as the cartridge case 110 in some embodiments, or other material suitably ridged. A gas channel or transport path 715 formed in the case 710 may extend from the gas exit 145 of case 110 and provide generated gas to a manifold 720 having multiple openings 722 to allow water vapor to reach case 110 and the gas generating fuel 112.

In one embodiment, manifold 720 forms a structural wall of the case 710, and also includes an array of channels 725 to provide gas to a membrane 730, such as a fuel cell membrane electrode assembly. In one embodiment, the gas is hydrogen, which is provided to an anode side of the membrane 730. The manifold sandwiches the membrane 730 to prevent hydrogen from leaking around the membrane, and also exposes a cathode side of the membrane to oxygen from ambient via openings 722. Electricity is produced by the membrane along with water vapor which migrates toward the cartridge case 110 along with ambient water vapor to reach the fuel 112 and produce more hydrogen, as regulated by the membrane valve assembly in case 110 based on the difference in pressure. The electricity generated may be provided to an external device, or a device in which the device 700 is integrated into in further embodiments.

Management electronics 740 may be disposed anywhere in the device 700, and is shown supported by a bottom plate 750 of device 700, which may be a power generator in some embodiments. In one embodiment, management electronics 740 is a controller, such as a micro-controller that may be adapted to manage power generation and delivery, including a rechargeable battery, battery charging integrated circuit, etc. Electronics 740 may be separable, and alternatively, its functions may be provided by device such as a mobile device like a smart phone or touchpad for example.

Figure 9:
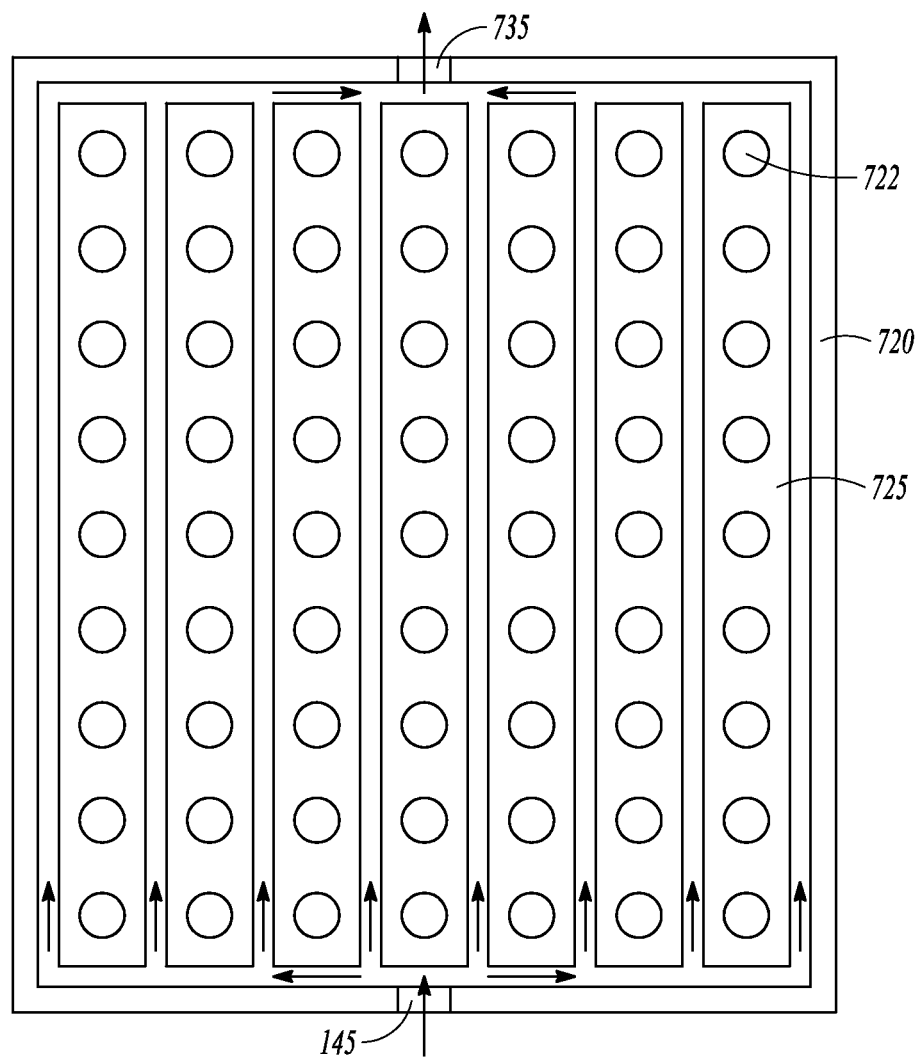
FIG. 9 is a top view block representation of a manifold for the power generator of FIGS. 7 and 8 according to an example embodiment.

The manifold 720 in one embodiment is illustrated in a top view representation in FIG. 9. Openings 722 are shown as round openings in one embodiment, with the channels 725 running between the openings 722 and containing fuel cell membranes 730 which may run the length of the channels 725 in one embodiment. Manifold 720 further includes an exhaust valve 735 which vents gas to ambient. The exhaust valve 735 may be solenoid controlled in one embodiment and may be used to exhaust nitrogen and other gases that may build up during operation. Exhaust valve 735 may also be actuated as a function of pressure, temperature or other sensed parameter or parameters in further embodiments. Also shown is check valve 150 from the case 110.

The device 700 in one embodiment contains a check-valve and fuel cartridge interface 755 which automatically opens the check valve 150 when the cartridge case 110 is inserted into the device cavity 712, allowing hydrogen to flow from the cartridge case 110 to the fuel cells 730. In some embodiments, multiple valves may be provided on the cartridge case 110 with the device 700 having multiple interfaces 755.

Device 700 in one embodiment is a fuel cell based power generator that utilizes hydrogen produced from a water reactive hydrogen generating fuel such as a hydride fuel. Production of hydrogen increases pressure in the case 110 while drawing hydrogen from the case reduces the pressure. When power is not drawn from the fuel cells, hydrogen is not drawn from the case 110 and the pressure inside the case increases as water vapor remaining in the case is used to create more hydrogen. The increased pressure pushes the membrane supported valve plates into a closed position with respect to the perforations, shutting off the supply of water vapor and leading to a decrease or cessation of hydrogen production. When power demands increase, the pressure is reduced, resulting in more water vapor being provided to the fuel 112 and the production of more hydrogen to provide to the fuel cells. An equilibrium pressure may be established dependent on the electrical load and ambient temperature and humidity.

In one embodiment, the manifold 720 is generally planar in shape and may consist of multiple cells connected in series. The power management electronics 740 may include a rechargeable battery, such as a Li-ion battery manufactured by Saft America Inc. The battery may be used to power the electronics and may also provide additional power during periods of high demand or transient fluctuations in power demand. The battery may be recharged utilizing electricity generated by the fuel cell. Other rechargeable or non-rechargeable batteries may be used in further embodiments. One or more sensors 760 may be included at various portions of the device 700 and coupled to the electronics 740 to provide temperature and/or pressure information for use in controlling various features, such as exhaust valve 735. A single sensor 760 is shown in block form in transport path 715 as an example of the one or more sensors. In further embodiments, the number and placement of sensors may vary as desired. In some embodiments the sensor 760 includes a least one of a temperature sensor pressure sensor, humidity sensor, and voltage sensor The fuel 112 may be formed of many different hydrides such as combinations of chemical hydrides, and combinations of chemical hydrides and metal hydrides may be used for the hydrogen producing fuel, such as for example alane $AlH_3$, $LiAlH_4$, $NaAlH_4$, $KAlH_4$, $MgAlH_4$, $CaH_2$, $LiBH_4$, $NaBH_4$, $LiH$, $MgH_2$, $Li_3Al_2$, $CaAl_2H_8$, $Mg_2Al_3$, alkali metals, alkaline earth metals, alkali metal silicides, or any combinations thereof that act as a water-reactive hydrogen-producing material that reacts with water vapor to produce hydrogen.

In one embodiment, the hydrogen producing fuel may be formed as pellets with a controlled porosity. The term pellet, is used in a broad sense to describe any shape or configuration of the hydride particles that occupy in the space allotted to the chemical hydride in the fuel source. Thus, the shape of the chemical hydride pellet is not critical. It may be a, layer, disk, tablet, sphere, or have no specific shape. The shape of the chemical hydride particles may be determined by the shape of the fuel source and the need to make the most efficient use of the space allotted to the chemical hydride. If appropriate, differently shaped chemical hydride pellets can be used within one fuel source.

The power generator may be formed in the size of a standard "AA", "AAA", "C", or "D" cell (or any other battery size) that can be removed and replaced. In further embodiments, the power generator may be positioned within a device to be powered in a manner that allows access to the fuel container to remove and replace it with a new or recharged fuel container and also allows access to ambient for providing oxygen to the fuel cell. In one embodiment, manifold 720 may be covered with a water resistant membrane 770, such as a Gortex® membrane to prevent damage to the device 700 if it is exposed to liquid water. Such a membrane may also be used in other embodiments.

Figure 10:
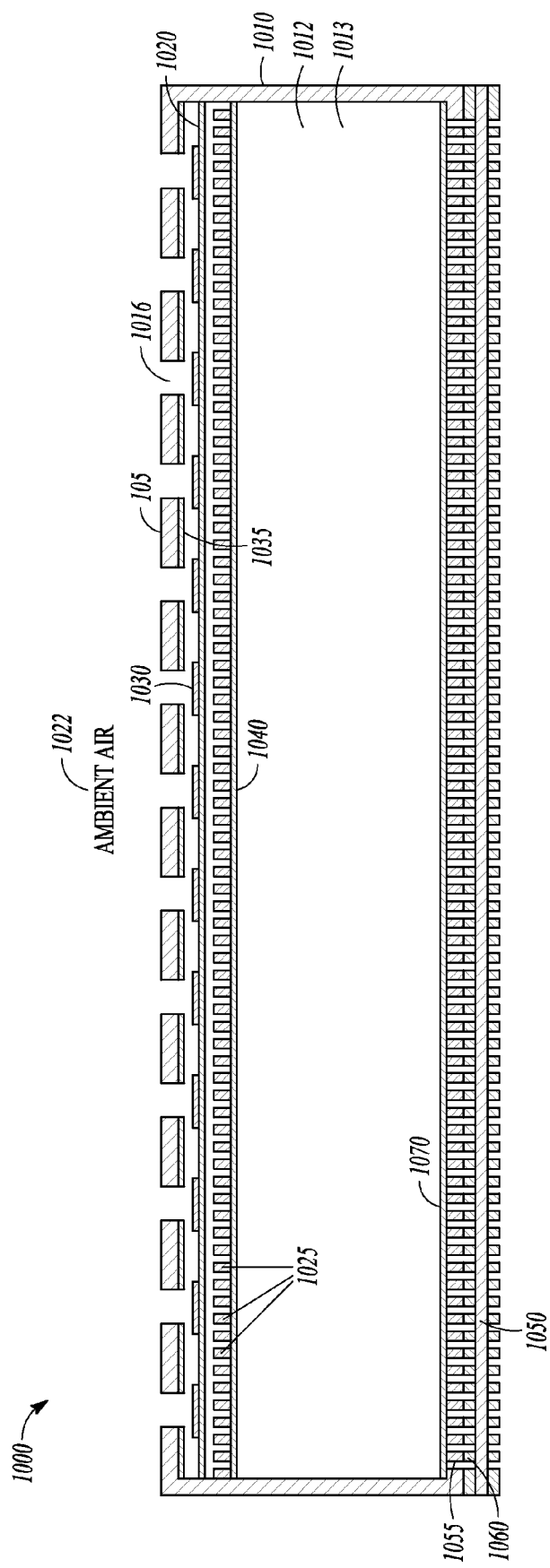
FIG. 10 is a cross section representation of a power generator incorporating a membrane with a valve assembly according to an example embodiment.
Figure 11:
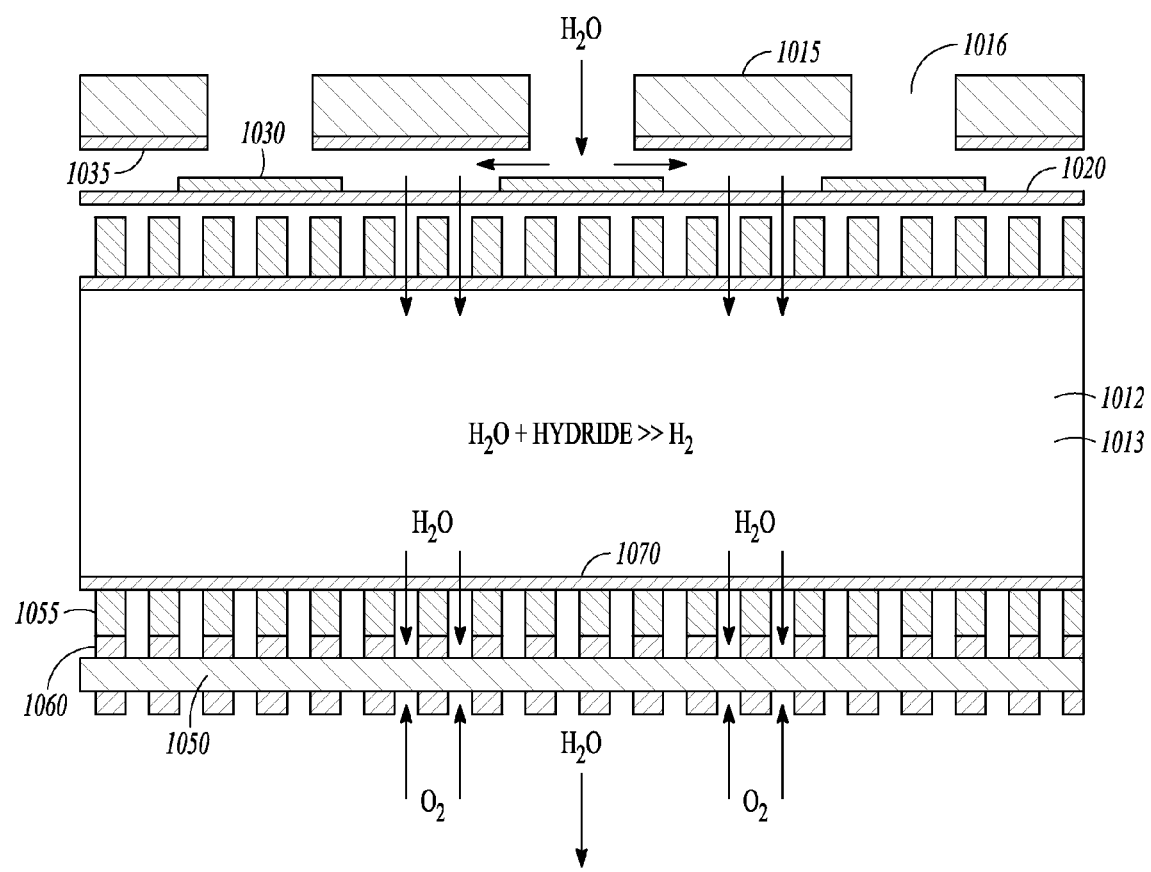
FIG. 11 is a cross section representation of a portion of the power generator of FIG. 10 according to an example embodiment.

FIG. 10 is a block cross section view of a fuel cell based power generator 1000. FIG. 11 is a blown up portion of the generator with numbering consistent with FIG. 10. In one embodiment, the power generator 1000 is formed with a self-modulated fuel container similar to that illustrated in FIG. 1. In one embodiment, generator 1000 comprises a case 1010 (metal or polymer) containing a water-reactive gas generating fuel 1012 in a cavity 1013. A side or face 1015 of the case 1010 is perforated 1016, and exposes a selectively permeable membrane 1020 (water vapor permeable, gas impermeable) which separates the fuel 1012 from the ambient environment 1022 outside the case 1010.

In one embodiment, the membrane 1020 is positioned between the perforated face 1015 and a perforated plate 1025. The membrane 1020 is flexible, and moves between the plate 1025 and face 1015 responsive to a difference in pressure between the cavity 1013 and ambient 1022. The plate 1025 and face 1015 bound the movement of the membrane 1020 in one embodiment such that the membrane is not unduly stressed via the difference in pressure that may develop. The membrane may be coupled to sides of the case 1010 via adhesive on a perimeter of the membrane or other method to provide a seal that allows the difference in pressure to cause the membrane 1020 to move transverse to the face 1015.

In one embodiment, the membrane 1020 comprises one or more valve plates 1030 that move toward the perforations 1016 when the pressure is higher inside the cavity 1013, and move away from the perforations when the pressure inside the cavity is lower than ambient 1022. In one embodiment, a gasket 1035 is formed about the perforations to form a seal with corresponding valve plates 1030 when the difference in pressure causes the membrane to push the valve plates 1030 into contact with the gasket. The gasket may be optional where the materials comprising the valve plates 1030 and face 1015 having perforations 1016 form an adequate seal when pressed against each other by the different in pressure. The differences in pressure in some embodiments modulate up to few tenths of a pound per square inch in one embodiment.

In various embodiments, the number of perforations 1016 in face 1015 may vary between one and many, forming an array of perforations. Similarly, the number of valve plates may be the same as the number of perforations, and arranged in an array to mate with each corresponding perforation. In still further embodiments, one or more larger valve plates may be used such that each valve plate may cover multiple perforations.

In one embodiment, a gas permeable particulate filter 1040 is positioned between fuel 1012 and plate 1025 to prevent fuel from clogging the perforations in the plate 1025. The fuel in various embodiments may be porous to allow the water vapor passing through the perforated face 1015, membrane 1020 in areas other than those contain the valve plates 1030, plate 1025, and filter 1040 to migrate through the fuel to generate more gas. The fuel porosity in one embodiment varies between approximately 15% and 20%. The porosity may be selected to allow adequate movement of gas and water vapor while at the same time providing a desired gas producing capability.

In one embodiment, a fuel cell proton exchange membrane (PEM) 1050 is supported by a further face 1060 of the power generator 1000. Face 1060 has perforations or holes that allow the hydrogen to migrate to the fuel cell 1050. The fuel cell 1050 receives hydrogen generated by fuel 1012 at an anode side facing the fuel 1012, generates electricity, and exhausts water vapor resulting from the reaction to ambient. A cathode side of the fuel cell 1050 is facing ambient and receive oxygen from ambient.

In one embodiment, the fuel cell 1050 is sandwiched between rigid plates 1060 that have holes to allow oxygen and water vapor to pass to and from the fuel cell. The holes may or may not line up with the face 1055 perforations. A particulate filter 1070 may also be provided between the face 1055 and the fuel 1012 to prevent clogging of the perforations by loose fuel. The fuel cell membrane may be sealed at the sides of the case to prevent ambient water vapor from reaching the fuel from the fuel cell side of the power generator.

Power generator 1000 in one embodiment integrates the membrane valve, fuel cartridge and fuel cell into one monolithic unit. In such a unit, there is no need for gas seals or routing channels to couple the hydrogen generator to the fuel cell, dramatically simplifying the design of a power generator. Control electronics may also be integrated or separate.

Figure 12:
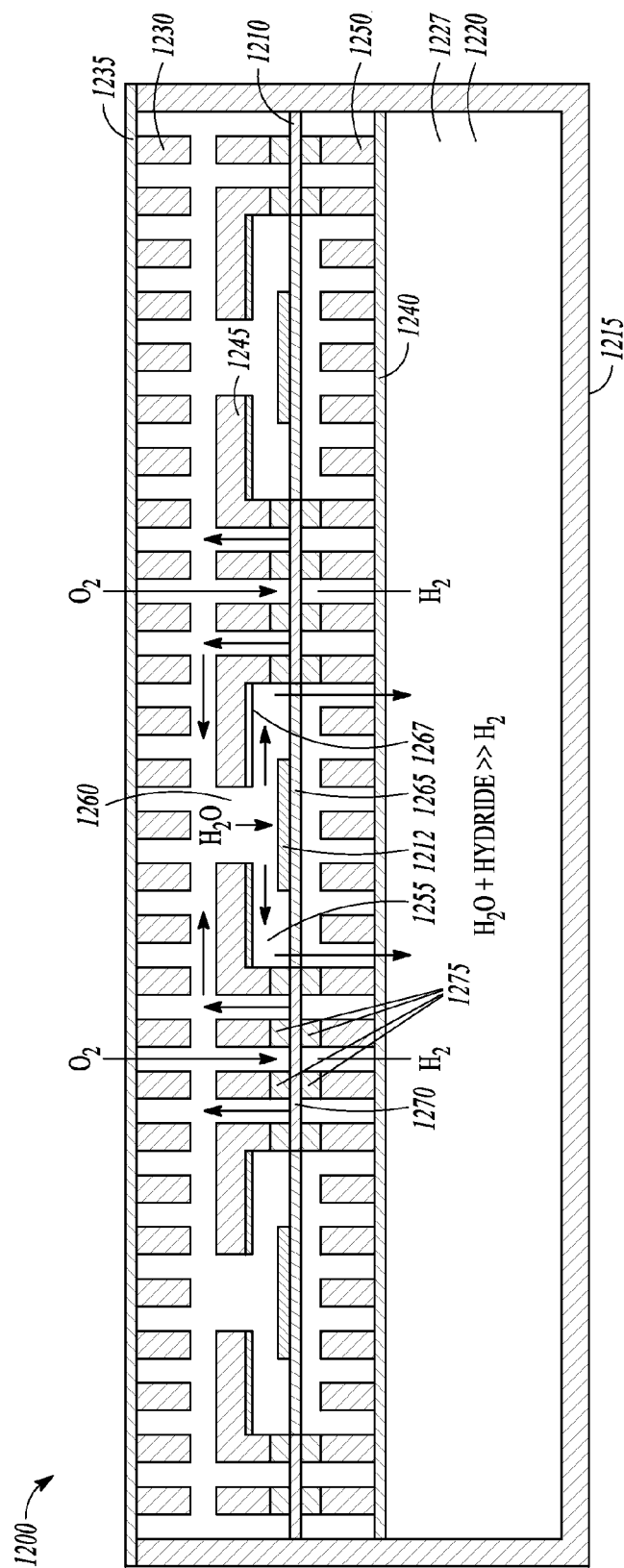
FIG. 12 is a cross section representation of a portion of an alternative power generator according to an example embodiment.

FIG. 12 is a block diagram of an alternative fuel cell based power generator 1200 utilizing a membrane 1210 based valve plate 1212 arrangement to control water vapor provided to fuel responsive to pressure. A power generator 1200 case 1215 has a chamber 1220 defined by a bottom side that holds hydrogen producing fuel 1227. A top side 1230 of case 1215 is permeable to gas and water vapor, and may also contain a liquid water impermeable membrane 1235. The top side 1230 may be perforated or otherwise permeable in various embodiments.

Membrane 1210 is disposed inside case 1215 between the top side 1230 and the fuel 1227, which may optionally have a particulate filter 1240 positioned to prevent migration of fuel toward membrane 1210. Membrane 1210 is sandwiched between two structural support layers 1245 and 1250 that provide different functions for different parts of membrane 1210. Support layer 1250 positioned between the membrane 1210 and fuel 1227 and is permeable to both water vapor and hydrogen. One portion of support layer 1245 forms a chamber 1255 with an opening 1260 that is exposed to water vapor migrating through top side 1230. A first membrane portion 1265 of the membrane 1210 is disposed within the chamber 1255 and includes the valve plate 1212 that moves with the membrane responsive to pressure to engage with the opening 1260 and prevent water vapor from passing to the fuel 1227 when the pressure in the fuel chamber 1220 is higher than ambient. A gasket 1267 may be disposed on layer 1245 about the opening 1260 to engage the valve plate 1212 as it moves to restrict water vapor flow through opening 1260.

A second membrane portion 1270 is patterned with anode and cathode catalysts, and acts as a membrane electrode assembly fuel cell membrane. Second membrane portion 1270 is positioned between support layer 1245 in an area outside the chambers 1255. Current collectors 1275 are shown contacting the second membrane portion 1270 to act as anode and cathode contacts. The current collectors 1275 may be patterned as conductive traces. In some embodiments, multiple chambers 1255 with membrane portions containing valve plates and second membrane portions form an array of valves and fuel cell membranes along a length and width of the membrane 1210. In some embodiments, control electronics may also be integrated or separate.

Figure 13:
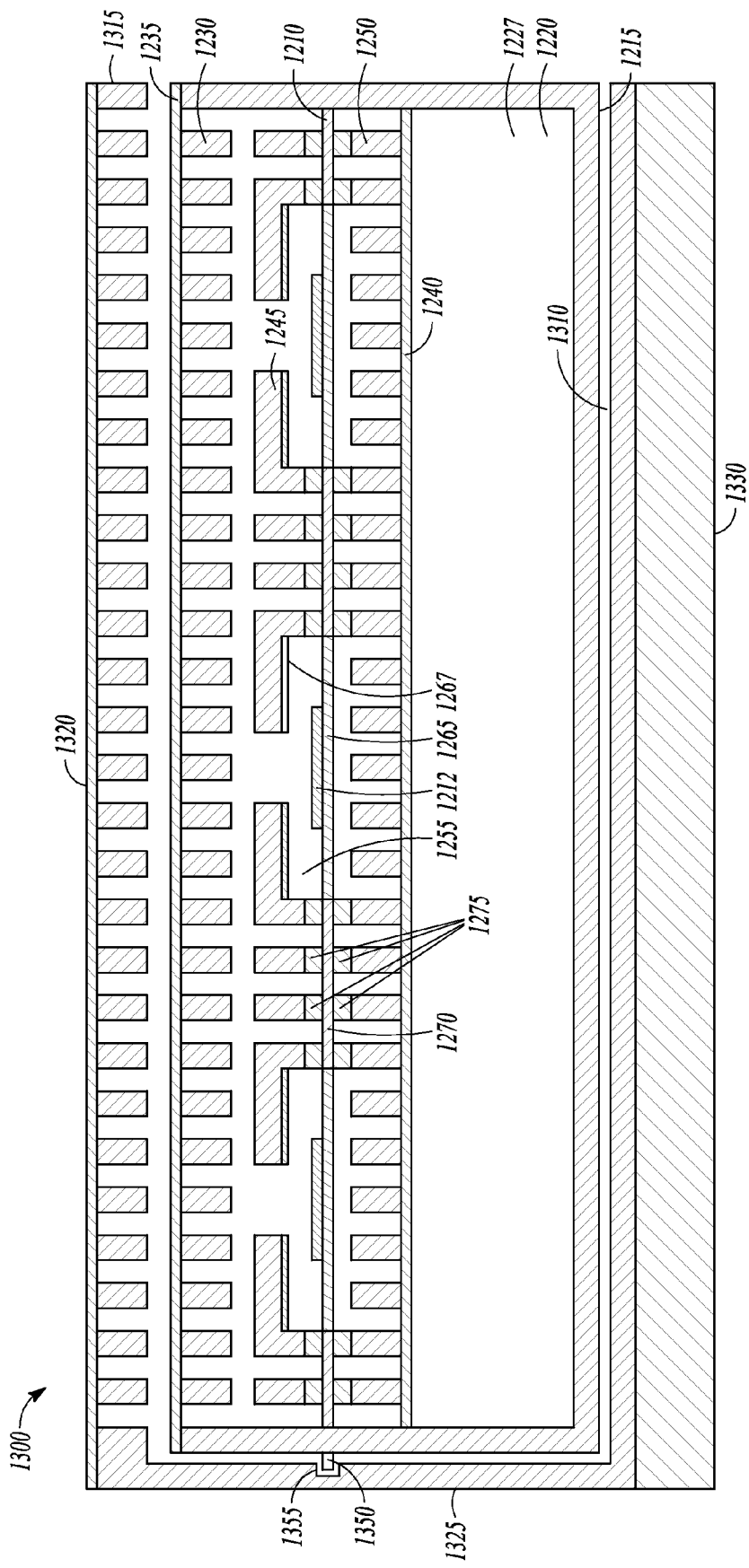
FIG. 13 is a cross section representation of a power generator container having a power generator inserted according to an example embodiment.

FIG. 13 is a block cross section of a power generator container 1300 having a replaceable power generator 1200 inserted into a power generator container cavity 1310, filling up the cavity in one embodiment. The power generator container 1300 contains a first side wall 1315 that is permeable to water vapor, and a gas permeable, liquid water impermeable membrane 1320 covering the wall to prevent particulates and liquid water from entering the generator 1200 and possibly reaching fuel 1227. In some embodiments, both membranes 1320 and 1235 may be used, or either one or both may be optional. A back side 1325 is shown opposite an opening of cavity 1310, and provides a stop when sliding the power generator 1200 into the cavity 1310. No additional gas paths are needed in this embodiment, as power generator 1200 provides hydrogen directly to fuel cell 1270. In one embodiment, control electronics 1330 are provided as previously described to both couple to electrodes of fuel cell 1270 for power transfer and potential storage. Container 1300 may also contain conductors between the control electronics 1330 and a connector 1350 on the power generator 1200 that mates with a mating connector 1355 on the power generator container 1300 when the power generator 1200 is plugged into the cavity 1310.

Figure 14:
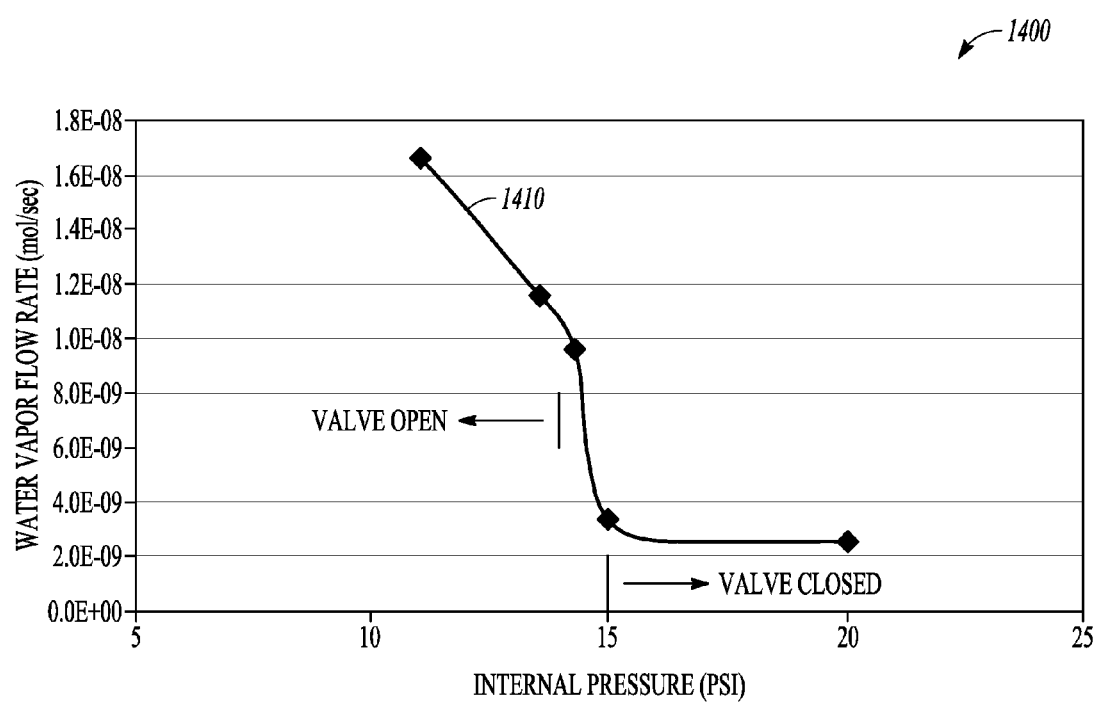
FIG. 14 is a graph illustrating water vapor flow rate versus internal pressure of a membrane based valve assembly according to an example embodiment.

FIG. 14 is a graph 1400 illustrating a proof of concept of a membrane with valve plate assembly according to an example embodiment. Water vapor flow rate in mol/second is shown on a y-axis, with internal pressure shown on an x-axis. A curve 1410 is annotated with the corresponding position of the valve. External pressure is atmospheric pressure, which appears to be just less than 15 psi. The valve appears to be open at a little less than 15 psi, and closed at 15 psi and greater. Note that some minimal flow still occurs when the valve is closed.

Figure 15:
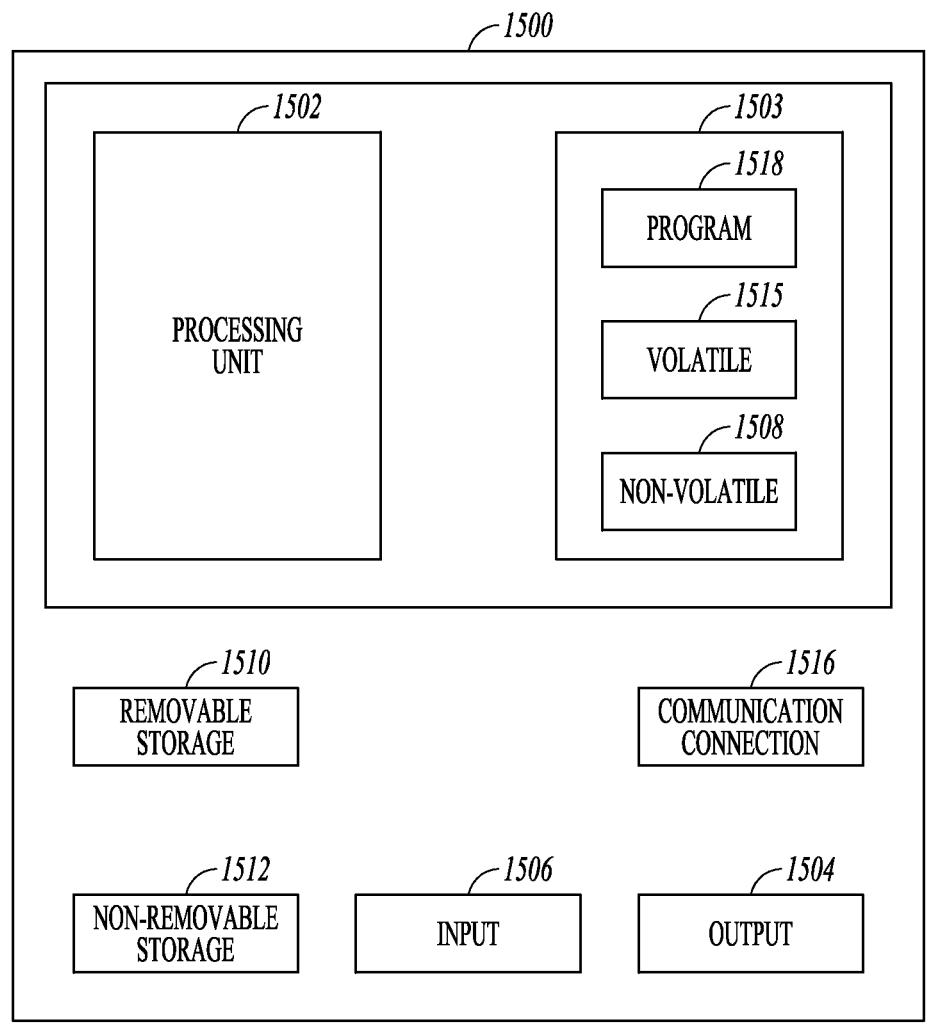
FIG. 15 is a block diagram of a computer system for implementing a controller according to an example embodiment.

FIG. 15 is a block schematic diagram of a computer system 1500 to implement control electronics according to an example embodiment. The computer system 1500 may also take the form of an integrated circuit or commercially available microprocessor or microcontroller having fewer components than shown in FIG. 15. One example computing device in the form of a computer 1500, may include a processing unit 1502, memory 1503, removable storage 1510, and non-removable storage 1512. Memory 1503 may include volatile memory 1514 and non-volatile memory 1508. Computer 1500 may include—or have access to a computing environment that includes—a variety of computer-readable media, such as volatile memory 1514 and non-volatile memory 1508, removable storage 1510 and non-removable storage 1512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1500 may include or have access to a computing environment that includes input 1506, output 1504, and a communication connection 1515. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1502 of the computer 1500. A hard drive, CD-ROM, and RAM are some examples of articles including a non-transitory computer-readable medium. For example, a computer program 1518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1500 to provide generic access controls in a COM based computer network system having multiple users and servers.

The following are sets of examples. Features from the various examples may be combined and interchanged in various embodiments. Membrane Valve Examples:

1. A device comprising:
    a case having a surface with a perforation and a cavity;
    a membrane supported by the case inside the cavity, the membrane having an impermeable valve plate positioned proximate the perforation, wherein the membrane is water vapor permeable and gas impermeable and flexes responsive to a difference in pressure between the cavity and outside the cavity to selectively allow water vapor to pass through the perforation into the cavity as a function of the difference in pressure.

2. The device of example 1 and further comprising a gasket positioned to mate between the perforation and the valve plate and form a seal between the valve plate and the perforation when the difference in pressure pushes the membrane and valve plate toward the perforation.

3. The device of any of examples 1-2 wherein the membrane is supported by the case at a perimeter of the membrane such that water vapor can only travel through the membrane to reach the cavity containing the gas generating fuel.

4. The device of any of examples 1-3 wherein the case further comprises a gas permeable plate positioned between the membrane and the cavity containing a gas generating fuel.

5. The device of example 4 and further comprising a particulate filter supported by the perforated plate to contain fuel particles within the cavity.

6. The device of any of examples 1-4 wherein the case further comprises an exit opening for gas generated from a gas generating fuel within the cavity responsive to water vapor.

7. The device of example 6 wherein the exit opening comprises a check valve.

8. The device of any of examples 1-7 and further comprising a hydride fuel disposed within the cavity to receive water vapor passed through the membrane.

9. The device of any of examples 1-8 wherein the case has an array of perforations and the membrane has a corresponding array of valve plates.

10. The device of example 9 wherein the array of valve plates are connected, forming a structurally reinforcing mesh on the membrane.

11. The device of example 10 wherein the mesh further comprises a perimeter band fastened to sides of the case and formed to facilitate movement of the membrane towards and away from the perforations of the case.

12. A device comprising:
a case having a surface with an array of perforations and a cavity containing a gas generating fuel;
a membrane supported by the case inside the cavity, the membrane having an array of impermeable valve plates, each positioned proximate a corresponding perforation, wherein the membrane is water vapor permeable and gas impermeable and flexes responsive to a difference in pressure between the cavity and outside the cavity to move the plate to block the perforations via the valve plates when the pressure inside the cavity is greater, and to unblock the perforations when the pressure inside the cavity is lower than outside the cavity.

13. The device of example 12 and further comprising:
a gasket positioned to mate between the perforation and the valve plate and form a seal between the valve plate and the perforation when the difference in pressure pushes the membrane and valve plate toward the perforation, wherein the membrane is supported by the case at a perimeter of the membrane such that water vapor can only travel through the membrane to reach the cavity containing the gas generating fuel;
wherein the case further comprises a perforated plate positioned between the membrane and the cavity containing the gas generating fuel;
a particulate filter supported by the perforated plate to contain fuel particles within the cavity; and
wherein the case further comprises an exit opening for gas generated from the fuel and water vapor.

14. The device of example 13 wherein the gas generating fuel comprises a hydride fuel disposed within the cavity to receive water vapor passed through the membrane.

15. The device of example 14 wherein the array of valve plates are connected, forming a structurally reinforcing mesh on the membrane.

16. The device of example 15 wherein the mesh further comprises a perimeter band fastened to sides of the case and formed to facilitate movement of the membrane towards and away from the perforations of the case.

17. A method comprising:
passing water vapor through a gas impermeable, water vapor permeable membrane to a gas producing fuel in a fuel container;
responsive to a gas pressure in the container higher than pressure outside the container, moving a plate supported by the membrane towards a perforation in the container to impede passing of water vapor to the gas producing fuel; and
responsive to a gas pressure in the container lower than pressure outside the container, moving the membrane and plate away from the perforation.

18. The method of example 17 and further comprising:
producing gas responsive to the water vapor reacting with the fuel in the container; and
providing the produced gas via a gas exit of the container.

19. The method of any of examples 17-18 wherein the perforation comprises an array of perforations, and the membrane comprises an array of plates corresponding to the array of perforations moving responsive to gas pressure with the membrane.

20. The method of example 19 wherein the gas producing fuel comprises a hydride that produces hydrogen that is supplied to a fuel cell.

Power Generator Having Hydrogen Manifold Examples:

1. A power generator comprising:
a cavity to accept a hydrogen producing fuel cartridge;
a channel to couple to and receive hydrogen from the fuel cartridge;
a manifold coupled to the channel to receive hydrogen from the channel, the manifold having an opening to receive oxygen and water vapor, the manifold being positioned to provide the water vapor to the cavity;
an array of fuel cell membranes supported by the manifold to receive hydrogen from the manifold and oxygen from the opening in the manifold.

2. The power generator of example 1 and wherein the array of fuel cell membranes is supported by the manifold in a position to provide water vapor to the cavity.

3. The power generator of any of examples 1-2 and further comprising a protrusion disposed within the cavity to engage a check valve of the fuel cartridge.

4. The power generator of any of examples 1-3 and further comprising an exhaust valve coupled to the manifold to controllably exhaust gas.

5. The power generator of example 4 and further comprising:
a sensor; and
a controller coupled to the sensor and to the exhaust valve to control the exhaust valve responsive to signals from the sensor.

6. The power generator of example 5 wherein the sensor comprises at least one of a temperature sensor pressure sensor, humidity sensor, and voltage sensor.

7. The power generator of any of examples 1-6 wherein the manifold comprises an array of hydrogen providing channels to distribute hydrogen to an anode side of each fuel cell membrane, and second openings to expose a cathode side of each fuel cell membrane to oxygen provided via the first openings.

8. The power generator of example 7 and further comprising a hydrogen producing fuel cartridge disposed within the cavity and coupled to the channel.

9. The power generator of any of examples 7-8 wherein the manifold has a planar structure, wherein the first openings comprise an array of air channels through the manifold, wherein the fuel cell membranes extend along the hydrogen providing channels separating the hydrogen from oxygen provided via the first openings, and wherein the manifold sandwiches the fuel cell membranes between an upper portion containing the hydrogen providing channels and a lower portion providing access to the oxygen.

10. The power generator of example 9 and further comprising:
a liquid water impermeable, gas and water vapor permeable membrane disposed between the cathode side of the fuel cell membranes and ambient; and
a vent coupled to the manifold to vent gas buildup in the manifold to the outside of the power generator.

11. A power generator comprising:
a cavity to accept a hydrogen producing fuel cartridge;
a channel to couple to receive hydrogen from the fuel cartridge;

a manifold coupled to the channel to receive hydrogen from the channel, the manifold having an opening to receive oxygen and water vapor, the manifold being positioned to provide the water vapor to the cavity;

an array of fuel cell membranes supported by the manifold to receive hydrogen from the manifold and oxygen from the opening in the manifold, wherein the manifold comprises an array of hydrogen providing channels to distribute hydrogen to an anode side of each fuel cell membrane, and a second opening to expose a cathode side of each fuel cell membrane to oxygen provided via the first opening;

an exhaust valve coupled to the manifold to controllably exhaust gas;

a sensor; and a controller coupled to the sensor and to the exhaust valve to control the exhaust valve responsive to signals from the sensor.

12. The power generator of example 11 and wherein the array of fuel cell membranes is supported by the manifold in a position to provide water vapor to the cavity.

13 The power generator of any of examples 11-12 and further comprising a protrusion disposed within the cavity to engage a check valve of the fuel cartridge.

14. The power generator of example 12 wherein the manifold has a planar structure, wherein the first opening comprises an array of air channels through the manifold, wherein the fuel cell membranes extend along the hydrogen providing channels separating the hydrogen from oxygen provided via the array of air channels, and wherein the manifold sandwiches the fuel cell membranes between an upper portion containing the hydrogen providing channels and a lower portion providing access to the oxygen.

15. The power generator of example 14 and further comprising:

a liquid water impermeable, gas and water vapor permeable membrane disposed between the cathode side of the fuel cell membranes and ambient; and a vent coupled to the manifold to vent gas buildup in the manifold to the outside of the power generator.

16. A method comprising:

inserting a fuel cartridge into a cavity of a power generator;

receiving hydrogen from the fuel cartridge into a hydrogen channel;

distributing the hydrogen to an anode side of an array of fuel cell membranes via a manifold having an array of hydrogen channels;

providing oxygen via an opening in the manifold to a cathode side of the array of fuel cell membranes to produce electricity; and providing water vapor to the fuel cartridge having a hydride that produces hydrogen when exposed to the water vapor.

17. The method of example 16 wherein the water vapor is provided via the opening in the manifold from outside the power generator.

18. The method of any of examples 16-17 wherein the water vapor is provided via the cathode side of the fuel cell membranes.

19. The method of any of examples 16-18 and further comprising modulating the amount of water vapor that reaches the hydride via a differential pressure responsive water vapor permeable, gas impermeable flexible membrane having a valve plate that mates with an opening in the fuel cartridge.

20. The method of example 19 and further comprising venting excess gas from the array of hydrogen channels in the manifold.

Power Generator Having Integrated Membrane Valve Examples:

1. A power generator comprising:

a case having a surface with a perforation and a cavity containing a gas generating fuel;

a membrane supported by the case inside the cavity, the membrane having an impermeable valve plate positioned proximate the perforation, wherein the membrane is water vapor permeable and gas impermeable and flexes responsive to a difference in pressure between the cavity and outside the cavity to selectively allow water vapor to pass through the perforation to the fuel as a function of the difference in pressure; and a fuel cell membrane supported by the case and positioned to receive hydrogen at an anode side of the fuel cell membrane and to receive oxygen from outside the power generator at a cathode side of the fuel cell membrane.

2. The power generator of example 1 and further comprising a first particulate filter disposed between the cavity and the membrane.

3. The device of any of examples 1-2 and further comprising a gasket positioned to mate between the perforation and the valve plate and form a seal between the valve plate and the perforation when the difference in pressure pushes the membrane and valve plate toward the perforation.

4. The device of any of examples 1-3 wherein the membrane is supported by the case at a perimeter of the membrane such that water vapor can only travel through the membrane to reach the cavity containing the gas generating fuel.

5. The device of any of examples 1-4 wherein the case further comprises a perforated plate positioned between the membrane and the cavity containing the gas generating fuel.

6. The device of example 5 and further comprising a particulate filter supported by the perforated plate to contain fuel particles within the cavity.

7. The device of any of examples 1-6 and further comprising a water reactive hydrogen generating fuel disposed within the cavity to receive water vapor passed through the membrane.

8. The device of any of examples 1-7 wherein the case has an array of perforations and the membrane has a corresponding array of valve plates.

9. The device of example 8 wherein the array of valve plates are connected, forming a structurally reinforcing mesh on the membrane.

10. The device of example 1 wherein the membrane comprises a catalyst patterned portion to form the fuel cell membrane.

11. The device of example 10 wherein water vapor produced by the fuel cell membrane is provided back to the fuel via perforation as selectively allowed by the membrane and valve plate.

12. The device of example 1 wherein the membrane and fuel cell membrane are positioned on opposite sides of the fuel.

13. A power generator comprising:

a case having a surface with an array of perforations and a cavity containing a gas generating fuel;

a membrane supported at a first side of the case inside the cavity, the membrane having an array of impermeable valve plates, each positioned proximate the perforations, wherein the membrane is water vapor permeable and gas impermeable and flexes responsive to a difference in pressure between the cavity and outside the cavity to selectively allow water vapor to pass through the perforations to the fuel as a function of the difference in pressure; and a fuel cell membrane supported to receive hydrogen at an anode side of the fuel cell membrane and to receive oxygen from outside the power generator at a cathode side of the fuel cell membrane.

14. The power generator of example 13 and further comprising:

a first particulate filter disposed between the cavity and the membrane; and a second particulate filter disposed between the cavity and the fuel cell membrane.

15. The power generator of any of examples 13-14 and further comprising an array of gaskets positioned to mate between the perforations and the valve plates and form a seal between the valve plates and the perforations when the difference in pressure pushes the membrane and valve plates toward the perforations.

16. The power generator of any of examples 13-15 wherein the membrane is supported by the case at a perimeter of the membrane such that water vapor can only travel through the membrane to reach the cavity containing the gas generating fuel.

17. The power generator of any of examples 13-16 wherein the case further comprises a perforated plate positioned between the membrane and the cavity containing the gas generating fuel, wherein the gas generating fuel comprises a hydride fuel.

18. A method comprising:

passing water vapor through a gas impermeable, water vapor permeable membrane to a gas producing fuel in a power generator;

responsive to a gas pressure in the container higher than pressure outside the power generator, moving a plate supported by the membrane towards a perforation in the power generator to impede passing of water vapor to the gas producing fuel;

responsive to a gas pressure in the power generator lower than pressure outside the power generator, moving the membrane and plate away from the perforation;

providing gas produced by the gas producing fuel reacting with the water vapor to a fuel cell membrane; and providing oxygen to the fuel cell membrane and exhausting water vapor produced by a reaction between hydrogen and oxygen away from the power generator.

19. The method of example 18 wherein the perforation comprises and array of perforations, and the membrane comprises an array of plates corresponding to the array of perforations moving responsive to gas pressure with the membrane.

20. The method of example 19 wherein the fuel cell membrane comprises catalyst coated portions of the membrane.

The invention claimed is:

1. A method comprising:

inserting a fuel cartridge into a cavity of a power generator;

receiving hydrogen from the fuel cartridge into a hydrogen channel;

distributing the hydrogen to an anode side of an array of fuel cell membranes via a manifold having an array of hydrogen channels, the array of fuel cell membranes sandwiched in the array of hydrogen channels to reduce hydrogen leakage;

providing oxygen via a plurality of ambient openings in the manifold to a cathode side of the array of fuel cell membranes to produce electricity; and providing water vapor to the fuel cartridge, wherein the fuel cartridge includes a hydride that produces hydrogen when exposed to the water vapor.

2. The method of claim 1 wherein the water vapor is provided via the plurality of ambient openings in the manifold from outside the power generator, and wherein the manifold supports an oxygen-permeable and liquid water impermeable membrane covering the plurality of ambient openings.

3. The method of claim 1 wherein the water vapor is produced by the array of fuel cell membranes and provided via the cathode side of the array of fuel cell membranes.

4. The method of claim 1 and further comprising self-regulating the amount of water vapor that reaches the hydride via a differential pressure responsive water vapor permeable, gas impermeable flexible membrane having a valve plate disposed on the flexible membrane that mates with an opening in the fuel cartridge, wherein:

the flexible membrane reduces the amount of water vapor that reaches the hydride responsive to an increased hydrogen pressure within the fuel cartridge; and the flexible membrane increases the amount of water vapor that reaches the hydride responsive to a decreased hydrogen pressure within the fuel cartridge.

5. The method of claim 4 and further comprising venting excess gas from the array of hydrogen channels in the manifold.

* * * * *